June 18, 1957

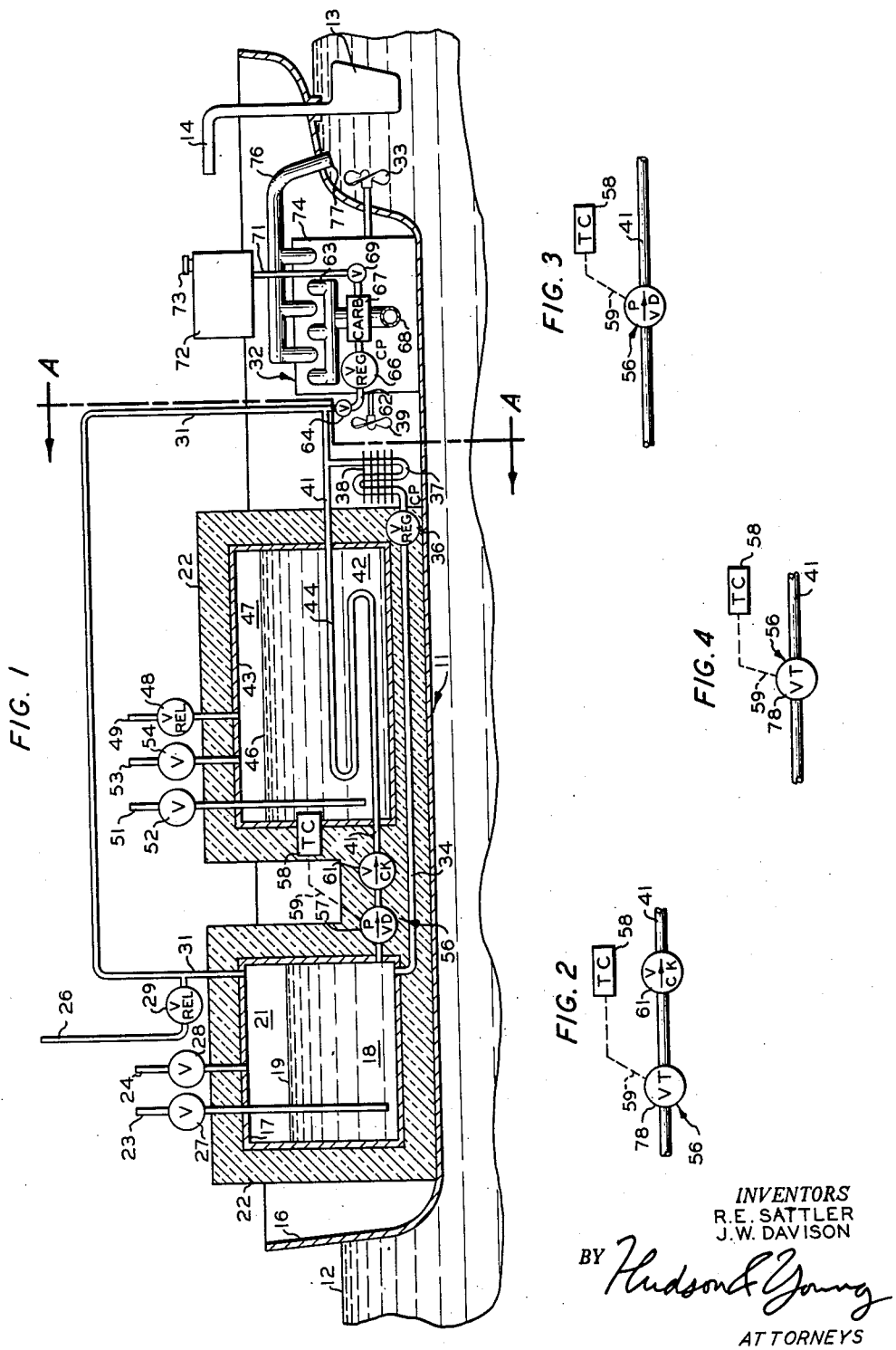

R. E. SATTLER ET AL 2,795,937

PROCESS AND APPARATUS FOR STORAGE OR
TRANSPORTATION OF VOLATILE LIQUIDS

Filed March 31, 1955

INVENTORS
R.E. SATTLER
J.W. DAVISON

BY Hudson & Young

ATTORNEYS

United States Patent Office 2,795,937
Patented June 18, 1957

2,795,937

PROCESS AND APPARATUS FOR STORAGE OR TRANSPORTATION OF VOLATILE LIQUIDS

Robert E. Sattler and Joseph W. Davison, Bartlesville, Okla., assignors to Phillips Petroleum Company, a corporation of Delaware Application March 31, 1955, Serial No. 498,322

10 Claims. (Cl. 62—1)

This invention relates to processes and apparatus for storage or transportation of volatile liquids, such as liquefied gases. In one aspect it relates to the transportation of a first liquefied gas, such as natural gas, in a refrigerated condition at a low superatmospheric pressure, in a heat insulated tank, with the use of that portion of said first liquefied gas as is evaporated by ambient heat leaking through said insulation as fuel for an engine contributing force to aid said transportation, and in respect to any need for fuel by said engine in excess of the gas formed by said heat leak, withdrawing some of said first liquid gas, gasifying said withdrawn portion by indirect heat exchange with the atmosphere, or with a second body of liquefied gas, and supplying the resulting gas to said engine. In another aspect the invention relates to the transportation of a first liquefied fuel gas, such as liquefied natural gas, at a low superatmospheric pressure and low temperature in one heat insulated tank, along with the transportation of a second liquefied gas which is less suitable for fuel due to expense, noxious nature, or non-inflammability such as ammonia, butane, butylene, ethane, ethylene, hydrogen sulfide, propane, propylene, or sulfur dioxide, in a heat insulated container in a refrigerated condition at low superatmospheric pressure without evaporation of said second gas, by passing a sufficient amount of said first liquid fuel gas in indirect evaporative heat exchange with said second liquid gas and employing the resulting evaporated first fuel gas as fuel for an engine contributing to the transportation of said first and second liquid gases, said second liquefied gas having a boiling point above that of said first liquefied gas.

In the prior art it has been proposed to transport normally gaseous substances in liquid form, either at extremely high pressures in very thick, heavy, and expensive tanks, or at a low temperature in heat insulated tanks at a low superatmospheric pressure with considerable resulting waste of the liquefied gas due to heat leakage through said heat insulation. When the liquid gas is inexpensive, such as liquid natural gas, this waste is relatively unimportant, and when the liquefied gas is a fuel gas it can be used as such in the engine furnishing propulsion to the transportation means; but when the liquid gas being transported is relatively expensive, and especially if it is unpleasant, or noxious, in gaseous form, and/or difficult or impossible to burn with air, then it is undesirable to allow evaporation of the same to the atmosphere, and the evaporating gas cannot be salvaged for use in an engine as fuel. The prior art has provided no means for the economical transportation of such a liquefied non-fuel gas at a low enough temperature at a low superatmospheric pressure to completely avoid venting gas while transporting the same. No such means were ever devised before the present invention, although the transportation of liquefied gases under high pressure, or under low pressure with evaporation of a substantial portion thereof, has been practiced for years.

The present invention avoids the difficulties of the prior art by transporting a first fuel gas at low temperature and low superatmospheric pressure in a heat insulated tank and employing the evaporating fuel gas therefrom in an engine to contribute to the transportation thereof, said heat insulation being sufficient to normally reduce the evaporation below the needs of said engine so that it is necessary to evaporate additional amounts of said first liquid fuel gas by supplemental means; said supplemental means comprising one or more of the following: (A) withdrawing said first liquid fuel gas in sufficient amounts to an indirect heat exchanger in heat exchange with the atmosphere to evaporate in the same and provide gas under a constant pressure to supply the needs of said engine; or (B) passing a sufficient amount of said first liquid fuel gas in indirect heat exchange with a second liquefied gas having a boiling point higher than said first liquefied fuel gas so as to maintain said second liquid gas refrigerated at a low enough temperature so that its vapor pressure is low enough that it need never be vented, and supplying the resulting evaporated first fuel gas to said engine. The present invention also resides in the production of apparatus peculiarly adapted to carry out the desired processes of the present invention.

One object of the present invention is to provide improved processes and apparatus for the storage and/or transportation of volatile liquids.

Another object is to provide for the transportation of a first liquefied fuel gas at a low temperature in a heat insulated tank at a low atmospheric pressure and to fully utilize the gas evaporating from the same under these conditions. Said evaporating fuel gas may be employed as fuel for an engine contributing to the transportation of said liquefied gas.

Another object is to employ a first evaporating fuel gas to cool a second liquefied gas having a higher boiling point by indirect heat exchange with the same to maintain said second gas in liquid form by refrigeration at a low temperature in a second tank at a low superatmospheric pressure without evaporation. Said first fuel gas evaporated in heat exchange with said second liquefied gas may then be used as fuel for said engine.

Numerous other objects and advantages will be apparent to those skilled in the art upon reading the accompanying specification, claims and drawings, in which:

Figure 1 is an elevational cross-sectional view in diagrammatic form of a vehicle, specifically a ship, embodying one species of the present invention.

Figure 2 is a diagrammatic view of a second form of temperature control which can be substituted for the specific temperature control shown in Figure 1.

Figure 3 is a diagrammatic view of a third form of temperature control which can be substituted for the temperature control of Figure 1.

Figure 4 is a diagrammatic view of a fourth form of temperature control which can be substituted for the temperature control of Figure 1.

Figure 5 is a vertical elevational view with parts in section, or broken away, of a second species of vehicle, specifically a tugboat and towed barge, embodying the present invention, said tugboat having a second species of power plant different than that shown in Figure 1.

Figure 6 is a diagrammatical view of a third species of power plant for any vehicle embodying the present invention.

It should be understood that the present invention involves storage in, and/or transport by means of any vehicle, such as an automobile land vehicle, railroad vehicle, ship, submarine, or aircraft. For the purpose of illustrating the invention, however, it is believed desirable to avoid showing all possible modifications in a prolix manner, and to merely set forth the best mode contemplated by the inventors of carrying out their invention in such full, clear, concise, and exact terms as to enable persons skilled in the art to practice the same. As the art of marine transportation is presently the most economical per ton per mile when the cost factor of time is considered small, the present invention will be described in the terms of embodiments selected from that art, but it should be understood this invention applies to any form of storage and/or transportation.

In Figure 1 a ship generally designated as 11 is illustrated floating on the surface 12 of a body of water over which it is desired to transport volatile liquids by marine transportation. Ship 11 will naturally be provided with a rudder 13, tiller 14, hull 16, and such other equipment and appurtenances as are considered convenient or desirable in ships, and it has not been deemed necessary to illustrate or discuss the same further.

Mounted anywhere in the hull 16 of the ship 11 is a tank 17 adapted to contain a first liquefied fuel gas 18 having liquid surface 19, and a vapor 21 of said liquid above the same, at a low but superatmospheric pressure. By low but superatmospheric pressure is meant any pressure between atmospheric and 100 pounds per square inch gauge (p. s. i. g.), said pressure of 100 p. s. i. g. being selected as critical because tanks designed to hold still higher pressures safely begin to increase more rapidly in wall thickness, weight, and cost, than at lower pressures at about this pressure, and therefore it is a critical pressure as to tank cost per pound of stored gas.

Tank 17 is constructed of any suitable metal, such as carbon steel, or alloy steel, and is supplied with a suitable layer of heat insulation 22, either as an external layer, as shown, or as an internal layer and/or an external layer as taught by the patent to Jackson 2,470,986 of May 24, 1949. The heat insulation may be any heat insulating material, such as glass wool, cork, or the other materials mentioned in Jackson, or known to the refrigeration art, although balsa wood in the form of an inner layer only is preferred for tank 17 when the container is filled with liquified natural gas, or liquid methane.

Tank 17 may be supplied with the usual liquid supply or withdrawal line 23, vapor withdrawal or supply line 24, and gas relief stack 26, controlled respectively by shutoff valves 27 and 28 and pressure relief valve 29, along with such other appurtenances and devices as are common to the prior art relating to such tanks such as liquid level gauges, thermometers, etc. and which seem necessary or desirable to the engineer designing the same, but which are not shown because not necessary to the practice of the invention.

No matter how thick insulation 22 is, the difference between the ambient atmospheric temperature and the boiling point of liquid 18 is so great that some heat is going to be leaking in through the insulation and causing evaporation of the liquid 18 in the form of gas 21, and if not used or discharged the pressure of this gas will rise in line 31 until it opens pressure relief valve 29, which may be set to open in any desired pressure from a few inches of water pressure above atmospheric to about 100 p. s. i. g. depending upon the working pressure tank 17 is designed for in the practice of the present invention, one particular predetermined pressure for operating being selected. It is preferred however, to not have relief valve 29 open, and this is accomplished by having pipe 31 conduct the fuel gas to an engine generally designated as 32 where it is employed as fuel to contribute to the transportation of the vehicle, for example by rotating screw propeller 33 in the species shown in Figure 1. The cold gas warms up going through pipe 31.

By the term engine it is intended to cover all suitable power plants known to the prior art, in which the fuel is either consumed in an internal combustion engine 32 or 133 as shown in Figures 1 and 6, or is consumed as fuel in an engine 86 comprising a burner 111, steam boiler 112, and steam turbine 116 as will be described with reference to Figure 5.

In Figure 1 the heat insulation 22 is selected of sufficient thickness to render the amount of gas 21 evaporating by heat leakage through said insulation to be insufficient to furnish the normal requirements of engine 22 in the transportation of the vehicle 11. Therefore, it is necessary to withdraw some of the liquid fuel gas 18 to supply the remainder of the fuel requirement of engine 32. This may be done in either, or both, of the following two ways:

First, liquid fuel gas may be withdrawn by gravity through line 34, or pumped (not shown) through line 34, through a pressure regulating valve 36 maintaining a constant pressure downstream, into an indirect heat exchanger 37 to which sufficient heat may be supplied to evaporate said portion of liquid gas to form the required amount of gas needed as fuel for said engine 32. The heat exchange at 37 is preferably with the atmosphere, as shown, said heat exchange being aided by conventional heating fins 38 and/or fan 39. Fan 39 if employed is driven by engine 32 or any suitable separate source of power. Other means for supplying heat to heat exchanger 37 can be employed in this invention, such as heat exchange with the water 12, or with an intermediate heat exchange fluid passed in further heat exchange with either the atmosphere or the water, but neither of these alternative heating systems is shown because the atmospheric heating shown at 37 is preferred.

The second mode of supplying supplemental gas to engine 32 through line 41 will now be discussed.

It is highly desirable to transport certain normally gaseous materials in liquid form, at low temperature and low pressure without any loss of gas whatsoever, which materials are considerably more expensive than liquid natural gas, and/or the vapors of which are not easily combustible with air and/or which are unpleasant, or noxious, to human beings, even though quite useful in industry. Such a second liquefied gas 42 may be transported by the present invention without loss of any vaporized gas therefrom, providing the boiling point of said second liquid 42 at the pressure existing in said second tank 43 is an appreciable amount above the boiling point of said first liquefied fuel gas 18. When the first liquid 18 is methane, or liquid natural gas which is largely methane, as methane has a boiling point of $-161.5°$ C. and natural gas boils about $-160°$ C., there is quite a range of gases which can be transported in liquid form as the second liquid 42 without any evaporation even at atmospheric pressure, and some of the most important of these, and their atmospheric pressure boiling points, are selected from the group consisting of ammonia $-33°$ C., butane $-0.6°$ C., butylene $-1.5°$ C., ethane $-88°$ C., ethylene $-104°$ C., hydrogen sulfide $-62°$ C., propane $-42°$ C., propylene $-47°$ C., and sulfur dioxide $-10°$ C. When confined at higher temperatures the vapor pressures of these liquified gases increases with increasing temperature. If propane is used as fuel gas 18, some gases such as anhydrous ammonia can be kept at atmospheric pressure in said second tank, but some, such as propylene would require about 5 p. s. i. g. pressure. The fuel gas 18 may be selected from the group consisting of methane, ethane, propane and butane.

Tank 43 containing liquid 42 is constructed in all respects similar to tank 17 described above. It is provided with the same type of heat insulation outside and/or inside, and as shown in Figure 1 this insulation may be an extension of insulation 22. However, as the boiling point of liquid 42 is higher than that of liquid 18, the heat insulation of tank 43 is of less importance, and for some liquids 42 could be made quite thin, or even eliminated. However, it is preferred to maintain a thickness of insulation 22 around tank 43 selected of such thickness that most of the gas being supplied to engine 32 will be supplied through line 41 by evaporation of liquid 18 in indirect heat exchanger 44. Heat exchanger 44 is preferably located inside tank 43 submerged in liquid 42 to remove the heat leaking in from the atmosphere through insulation 22 by evaporation of liquid 18 inside pipe 44. However any other disposition of pipe 44, as along the bottom of tank 43 (not shown) which places liquid 42 in indirect heat exchange with the fluid in pipe 44 is equivalent in the practice of the invention.

Liquid 42 has a surface 46 above which gas 47 forms, and normally the pressure of gas 47 at the temperature liquid 42 is kept at by pipe 44 is insufficient to ever open pressure relief valve 48 in gas relief stack 49. However, it is wise to provide relief stack 49 communicating with the interior of tank 43 to prevent explosion of tank 43 in case of some unforeseen emergency. Tank 43 may also be provided with liquid filling and withdrawal line 51 containing shutoff valve 52, vapor withdrawal and filling line 53 controlled by shutoff valve 54, and such other appurtenances known to the prior art for such tanks as may be deemed desirable.

Line 41 communicating between tank 17 and engine 32 is provided upstream of heat exchange portion 44 with suitable flow control means, generally designated as 56, one form of which is shown in Figure 1, and three other forms of which are shown in Figures 2, 3 and 4.

In Figure 1 the flow control means 56 comprises variable delivery pump 57 driven from any suitable source of power, the delivery of which is selected and controlled by temperature control 58 through any suitable control circuit 59, a large number of which are available in the prior art, employing thermocouples, thermistors, or any mechanical or electrical thermostat means (not shown in detail).

While not necessary, it is desirable to employ a check valve 61 to obviate any temporary reversal of flow in line 41 which might accidentally occur, as it is not desirable for any fluid to return to tank 17 bearing any appreciable amount of heat with it.

Lines 31, 34 and 41 are connected together and supply gas to engine 32 through line 62. While line 62 could lead directly to the intake manifold 63 of engine 32, it is preferred to provide line 62 with a shutoff valve 64, and a pressure regulating valve 66 providing a constant pressure downstream and then pass the gas to the intake manifold either directly, or through a carburetor 67. Wherever a single valve 66 is shown for reducing gas pressure to a constant downstream pressure, this may be done in one stage as shown, or there can be a plurality of such valves in series to reduce the pressure by stages (not shown because such multistage reduction is very old in this art). By setting the constant pressure downstream of regulating valve 66 slightly below atmospheric pressure, loss of gas through the air intake 68 of manifold 63 is obviated, as gas will not flow unless the engine is turning over with resulting vacuum in the intake manifold.

While carburetor 67 is not essential, as gas line 62 could be connected in direct communication with intake manifold 63, and valve 64 used as a throttle valve, the use of carburetor 67 is preferable to act as a throttle valve in controlling the speed of engine 32. Also carburetor 67 has an additional function in that shutoff valve 64 can be closed if it is not desired to use gas 21, or if gas 21 is exhausted, and then shutoff valve 69 may be open and an auxiliary fuel such as gasoline, may be supplied to the carburetor through line 71 from fuel tank 72 having the usual filling cap 73. This is an emergency feature in the ship 11 of Figure 1, but if used in the tug boat 81 of Figure 5 an auxiliary fuel is essential when the tug is disconnected from the barge.

The burned fuel from the cylinder block 74 of engine 32 is exhausted through exhaust manifold 76 in the usual manner, and may be discharged a slight distance under water through outlet 77 as shown in order to muffle the noise of the same.

While in theory it would be most economical to operate without carburetor 67 and auxiliary fuel tank 72 by merely running pipe 62 directly into communication with intake manifold 63, and rely on foresight in always having sufficient liquid methane 18 left to return to base, after discharging liquid 42 and as much of liquid 18 as desired and otherwise completing the trip, it is much preferred to have the auxiliary fuel tank and carburetor. If anything unexpected occurs to delay the ship at some isolated spot in the river, due to floods, storms, or other unexpected contingencies, or accidents, it is a lot easier to carry tins of gasoline from a nearby service station to the ship to replenish auxiliary tank 72, than it is to make a special trip with very special storage and refrigeration equipment in order to replace liquid methane 18, although of course the latter could be done.

In Figure 2 is shown the second species of the flow control system generally designated as 56 which can be substituted for that in Figure 1. The difference is that in Figure 2 a throttle valve 78 is substituted for the variable delivery pump 57. Because of pressure equalization through line 31, the system of Figure 2 will operate by gravity feed due to the difference in elevation of surface 19 of liquid 18 and the point where the liquid becomes discontinuous in heat exchanger 44 due to evaporation. Check valve 61 is employed as before.

Figure 3 shows the third species of the flow control system generally designated as 56 and may be substituted for that shown in Figure 1, the systems being identical except that in Figure 3 the check valve 61 of Figure 1 is eliminated.

Figure 4 shows the fourth species of the flow control system generally designated as 56 which may be substituted in Figure 1, and it will be noted that it is the same as that shown in Figure 2 with throttle valve 78 except that the check valve 61 has been eliminated.

Figure 5 shows the second species of vehicle, namely a barge generally designated as 79 which is towed through the body of water 12 by a tugboat generally designated as 81 by means of a towing cable 82 suitably secured at 83 and 84 to the respective boats. Figure 5 also shows a second species of engine generally designated as 86.

To the left of valve 87 in Figure 5, barge 79 contains all of the tanks and other equipment shown to the left of line A—A in Figure 1, being connected thereto by pipe 88 to valve 87 in the same manner they are connected to valve 64 in Figure 1, valve 64 and 87 both being shutoff valves. If it is desired to have a heating fan 89 in barge 79 for the same purpose as fan 39 in Figure 1 it is driven by an auxiliary power source, such as electrical motor 91, which may be supplied from a source such as batteries (not shown), and/or by electricity supplied through detachable electric cable 92 and wires 93 and 94 from generator 96 on the tugboat. The gas passing through valve 87 travels through pipe 97, flexible conduit 98 and pipe 99. Suitable connections 101 and 102, 103 and 104 are provided for disconnection of electrical conduit 92 and flexible gas conduit 98 when it is desired to disconnect tugboat 81, at which time tow cable 82 is also disconnected.

Tugboat 81 is provided with a conventional hull 106, rudder 107, marine screw propeller 108, and such other conventional features as may be desired. The flow of gas through gas supply pipe 99 is controlled by throttle valve 109 and is fed to burner 111 where it burns under steam boiler 112 in which water is boiled to form steam under pressure which emerges through steam line 113. By means of throttle valve 114 the amount of steam is regulated going to turbine or other type of prime mover 116, to drive shaft 117 and propeller 108, the steam exhausting through a suitable exhaust 118. Similarly, if desired, some steam is taken through throttle valve 119 to turbine 121 to drive generator 96 and the steam exhausts at 122.

Auxiliary fuel is provided for burner 111 for use when tugboat 81 is disconnected from barge 79. This auxiliary fuel may be any liquid or gaseous fuel, and could even be coal (not shown) burned outside of burner 111, but it is preferred to use liquefied petroleum gas fuel, known as "LPGas" such as liquefied propane, or liquefied butane, or mixtures of the two, in a pressure fuel tank 123 kept at ambient atmospheric temperature and normal vapor pressure of said fuel at that temperature, which may be as much as 200 p. s. i. g. or more, which LPGas is vaporized by passing through a line 124, regulating valve 126 which provides for constant reduced pressure downstream in atmospheric indirect heat exchanger pressure 127, from which the vaporizer LPG fuel is fed to burner 111 through throttle valve 128 and line 129. Although not shown, a second stage pressure reducing valve, or more stages, can be added between 126 and burner 111 in series in pipe 129, each stage being similar to valve 126. Between heat exchanger 127 and valve 128 is a good place for a second stage valve similar to valve 126. Throttle valves 109 and 128, of course, can completely shutoff the flow in their respective conduits when desired.

Tank 123 may contain all the conventional features of LPGas fuel tanks, such as pressure filling cap device 131 and relief valve 132, the other details of tank 123 not being shown because conventional and not essential.

Figure 6 shows a third species of engine generally designated as 133 suitable for use in place of either engine 32 of Figure 1 or engine 86 of Figure 5. In many instances the engine of Figure 6 is preferable. The natural gas line 134 from the downstream side of valve 64 of Figure 1 or valve 87 of Figure 5 supplies gas to a dual fuel diesel engine 136 through throttle valve 137. These dual fuel diesel engines are well known in the art and when operating with gas from line 134 the gas is compressed by the pistons on the compression stroke and ignited by the injection of diesel fuel into the cylinder through the respective injection line 138, 139 or 141, a three cylinder engine being shown in Figure 6. During such an operation a large amount of the gas 134 is consumed along with a small amount of diesel oil, but when desired gas 134 can be completely cut off by throttle valve 137, and, by shifting lever 142 from its position to the dotted line position 143, the rate of injection of the diesel injection pump 144 can be increased sufficiently so that the diesel engine 133 operates entirely on diesel fuel coming from fuel tank 146 having filler cap 147. The drive shaft 148 of engine 136 may be used to drive the injection pump 144 and propeller 33 of Figure 1 (or 108 of Figure 5) is driven through a second portion 149 of said drive shaft. If desired, electricity may be generated by generator 151 also driven by shaft 149.

Operation

In the operation of the invention of Figure 1, liquid natural gas 18 is maintained in a refrigerated condition in heat insulated tank 17 at a low superatmospheric pressure of less than 100 p. s. i. g., but preferably at not more than 5 to 10 p. s. i. g., at a temperature of its boiling point at that pressure of about $-160°$ C. Pressure relief valve is set at the desired relief pressure, say 5 p. s. i. g. As tank 17 will have not been built to stand much more pressure than relief valve 29 is set for, it is the primary function of the system that pressure in lines 31, 34, and 41 will not go over said relief pressure, say 5 p. s. i. g. Valve 36 is set to open only when the pressure in 37 drops a predetermined amount below said 5 p. s. i. g., for example 4 p. s. i. g. Valve 66 only opens when the engine 32 is running and there is a vacuum in intake manifold 63 due thereto. Temperature control 58 is set to pump first liquid natural gas 18 through line 44 to cool a second liquid 42 in tank 43 to a predetermined temperature at which the vapor pressure of vapor 47 will always be less than the setting of relief valve 48. Relief valve 48 is set a safe distance below the bursting strength rating of tank 43 of less than 100 p. s. i. g., but preferably at not more than 5 to 10 p. s. i. g., in which case tank 43 will be built to not take more than 10 to 20 p. s. i. g. internal pressure.

It is therefore obvious that if the heat insulation on tank 43 is designed to permit about the right rate of heat leakage, that the fuel 62 for engine 32 will be supplied essentially by liquid natural gas evaporating in coil 44 in quantities sufficient to keep second liquid 42 cool enough and near enough its boiling point (for example $-104°$ C. for ethylene) to keep it from evaporating and relief valve 48 will remain closed so that none of liquid 42 is ever lost. Some small amount of the fuel will be supplied to line 62 by line 31 due to minor evaporation in tank 17. If this supply is greater than the demand of engine 32, the pressure in 31 will go up above 5 p. s. i. g., and relief valve 29 will vent the excess amount to the atmosphere at a safe point 26. If this supply is less than the demand of the engine, the pressure in line 31 will go down below 4 p. s. i. g. and valve 36 will open allowing liquid natural gas to flow into coils 37 and evaporate to supply the additionally needed fuel.

The same is true of the other figures, except that gravity flow replaces the pump in Figures 2 and 4 and the check valve 61 is eliminated in Figures 3 and 4.

In Figure 5 the engine 86 is a steam engine, and in Figure 6 it is a diesel engine 133. In each of Figures 1, 5 and 6 a suitable auxiliary fuel is employed in case all the liquid natural gas evaporates, or the supply becomes detached from the engine, as when barge 79 is disconnected from tugboat 81 by disconnecting pipe 98, cable 92 and tow line 82. The auxiliary fuel in Figure 1 is gasoline, or kerosene, or other liquid motor fuel, in Figure 5 it is LPGas, which could also be used in the engine of Figure 1 and in Figure 6 it is diesel fuel.

While a number of embodiments have been shown for purposes of illustration, the invention obviously is not limited thereto. For example, while tanks 17 and 43 are shown, described, and claimed, as single tanks, obviously in details of vehicle construction it will sometimes be better structural design to use a plurality of tanks connected in parallel, or connected in series, for either, or both, of tanks 17 and 43. As this is an obvious expedient it has not been shown in the drawings.

Having described our invention, we claim:

1. The process of transporting a first liquefied fuel gas, comprising storing said fuel gas as a liquid at low superatmospheric pressure and low temperature in a first heat insulated zone, storing a second liquefied gas in a second heat insulated zone in a refrigerated condition at low superatmospheric pressure, preventing the evaporation of said second gas by passing a sufficient amount of said first liquid fuel gas in indirect evaporative heat exchange with said second liquid gas to refrigerate said second gas, employing the resulting evaporated first fuel gas as fuel for an engine, and applying the power developed by said engine to transport said zones, said second gas having a boiling point at the pressure in said second zone above that of said first gas at atmospheric pressure.

2. The process of claim 1 in which said second gas is ethylene.

3. The process of claim 1 in which said fuel gas is selected from the group consisting of methane, ethane, propane and butane.

4. The process of transporting a first liquefied fuel gas in a refrigerated condition at a low superatmospheric pressure, comprising storing said first liquid gas in a substantially heat insulated first zone, employing that portion of said first gas as is evaporated by ambient atmospheric heat leaking into said first zone as fuel for an engine, storing a second liquefied gas in a second heat insulated zone in a refrigerated condition at low superatmospheric pressure, preventing the evaporation of said second gas by passing a sufficient amount of said first liquid fuel gas in indirect evaporative heat exchange with said second liquid gas to refrigerate said second gas, employing the resulting evaporated first fuel gas as fuel for said engine, withdrawing a sufficient additional amount of said liquid first fuel gas from said first zone to supply said engine with enough fuel to provide sufficient power for said transport, vaporizing said additional liquid gas en route to said engine by indirect heat exchange, and applying the power developed by said engine to transport said zones, said second gas having a boiling point at the pressure in said second zone above that of said first gas at atmospheric pressure.

5. The process of transporting a first liquefied fuel gas in a refrigerated condition at a low superatmospheric pressure, comprising storing said first liquid gas in a substantially heat insulated first zone, storing a second liquefied gas in a second heat insulated zone in a refrigerated condition at low superatmospheric pressure, preventing the evaporation of said second gas by passing a sufficient amount of said first liquid fuel gas in indirect evaporative heat exchange with said second liquid gas to refrigerate said second gas, employing the resulting evaporated first fuel gas as fuel for an engine, withdrawing a sufficient additional amount of said liquid first fuel gas from said first zone to supply said engine with enough fuel to provide sufficient power for said transport, vaporizing said additional liquid gas en route to said engine by indirect heat exchange, and applying the power developed by said engine to transport said zones, said second gas having a boiling point at the pressure in said second zone above that of said first gas at atmospheric pressure.

6. The process of transporting a first liquefied fuel gas in a refrigerated condition at a low superatmospheric pressure, comprising storing said first liquid gas in a substantially heat insulated first zone, employing that portion of said first gas as is evaporated by ambient atmospheric heat leaking into said first zone as fuel for an engine, storing a second liquefied gas in a second heat insulated zone in a refrigerated condition at low superatmospheric pressure, preventing the evaporation of said second gas by passing a sufficient amount of said first liquid fuel gas in indirect evaporative heat exchange with said second liquid gas to refrigerate said second gas, employing the resulting evaporated first fuel gas as fuel for said engine, and applying the power developed by said engine to transport said zones, said second gas having a boiling point at the pressure in said second zone above that of said first gas at atmospheric pressure.

7. A vehicle for transporting liquefied gas comprising a frame, a first heat insulated tank, a second heat insulated tank, and an engine mounted on said frame, a vapor line connecting the upper part of said first tank in communication with the intake of said engine, a pressure relief valve in said vapor line, a first liquid withdrawal line connecting the lower part of said first tank with the intake of said engine, a regulating valve for maintaining a constant pressure downstream in said first liquid line, an indirect heat exchanger in said first liquid line between said regulating valve and said engine intake, a second liquid withdrawal line connecting the lower portion of said first tank in communication with said engine intake, flow control means in said second liquid line, said second liquid line between said flow control means and the intake of said engine passing in indirect heat exchange with said second tank, and temperature sensitive means in said second tank connected to control the operation of said flow control means.

8. A vehicle for transporting liquefied gas comprising a frame, a first heat insulated tank, a second heat insulated tank, and an engine mounted on said frame, a first liquid withdrawal line connecting the lower part of said first tank with the intake of said engine, a regulating valve for maintaining a constant pressure downstream in said first liquid line, an indirect heat exchanger in said first liquid line between said regulating valve and said engine intake, a second liquid withdrawal line connecting the lower portion of said first tank in communication with said engine intake, flow control means in said second liquid line, said second liquid line between said flow control means and the intake of said engine passing in indirect heat exchange with said second tank, and temperature sensitive means in said second tank connected to control the operation of said flow control means.

9. A vehicle for transporting liquefied gas comprising a frame, a first heat insulated tank, a second heat insulated tank, and an engine mounted on said frame, a vapor line connecting the upper part of said first tank in communication with the intake of said engine, a pressure relief valve in said vapor line, a liquid withdrawal line connecting the lower portion of said first tank in communication with said engine intake, flow control means in said liquid line, said liquid line between said flow control means and the intake of said engine passing in indirect heat exchange with said second tank, and temperature sensitive means in said second tank connected to control the operation of said flow control means.

10. A vehicle for transporting liquefied gas comprising a frame, a first heat insulated tank, a second heat insulated tank, and an engine mounted on said frame, a liquid withdrawal line connecting the lower portion of said first tank in communication with said engine intake, flow control means in said liquid line, said liquid line between said flow control means and the intake of said engine passing in indirect heat exchange with said second tank, and temperature sensitive means in said second tank connected to control the operation of said flow control means.

References Cited in the file of this patent

UNITED STATES PATENTS

| | | |
|---|---|---|
| 1,905,971 | Davisson et al. | Apr. 25, 1933 |
| 1,931,698 | Holzapfel | Oct. 24, 1933 |
| 2,456,386 | Cooper | Dec. 14, 1948 |
| 2,456,890 | St. Clair | Dec. 21, 1948 |
| 2,550,886 | Thompson | May 1, 1951 |
| 2,645,906 | Ryan | July 21, 1953 |
| 2,676,467 | Morrison | Apr. 27, 1954 |